(12) United States Patent
Bando et al.

(10) Patent No.: US 8,867,247 B2
(45) Date of Patent: Oct. 21, 2014

(54) DC/AC POWER CONVERTER WITH DC SIDE DOUBLE FREQUENCY PULSATION SUPPRESSION CAUSED BY AC SIDE FAULTS

(75) Inventors: Akira Bando, Hitachi (JP); Yasuhiro Kiyofuji, Hitachi (JP); Masaya Ichinose, Hitachiota (JP); Hiromitsu Sakai, Tokai (JP); Yasuhiro Imazu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 13/420,718

(22) Filed: Mar. 15, 2012

(65) Prior Publication Data

US 2012/0170333 A1 Jul. 5, 2012

(51) Int. Cl.
*H02M 7/5387* (2007.01)
*H02M 7/5395* (2006.01)
*H02M 1/14* (2006.01)

(52) U.S. Cl.
CPC .............. *H02M 7/5395* (2013.01); *H02M 1/14* (2013.01)
USPC ........................................................ 363/98

(58) Field of Classification Search
CPC .................................................. H02M 7/5387
USPC ......................................................... 363/98
See application file for complete search history.

(56) References Cited

U.S. PATENT DOCUMENTS

| | | | | |
|---|---|---|---|---|
| 5,187,427 A | * | 2/1993 | Erdman | 323/207 |
| 5,214,575 A | * | 5/1993 | Sugishima et al. | 363/37 |
| 5,257,180 A | * | 10/1993 | Sashida et al. | 363/71 |
| 5,351,178 A | * | 9/1994 | Brennen et al. | 363/40 |
| 6,304,468 B2 | * | 10/2001 | Ichinose et al. | 363/55 |
| 7,643,317 B2 | * | 1/2010 | Katoh et al. | 363/44 |
| 8,693,229 B2 | * | 4/2014 | Saeki et al. | 363/98 |
| 2012/0170333 A1 | * | 7/2012 | Bando et al. | 363/56.01 |
| 2014/0078796 A1 | * | 3/2014 | Inoue et al. | 363/68 |

OTHER PUBLICATIONS

Hideyuki Mimura et al., "Development of a Large-Scale Solar Power Generation System", Hitachi Review, Mar. 2009, vol. 91, No. 3, pp. 56-59 (four (4) sheets).

* cited by examiner

*Primary Examiner* — Jeffrey Sterrett
(74) *Attorney, Agent, or Firm* — Crowell & Moring LLP

(57) ABSTRACT

A commanded negative-sequence current is added to a commanded current so as to suppress double-frequency pulsation on the DC side. The commanded negative-sequence current is found from three values (i.e., the detected value of positive-sequence voltage vector on the power-supply side, the detected value of negative-sequence voltage vector, and a commanded positive-sequence current). Thus, the pulsations which occur on the DC side of a semiconductor power converter and which have a frequency double the power-supply frequency are suppressed even when the AC power supply is at fault while assuring stability of the current control system, thus permitting stable and continuous operation.

3 Claims, 7 Drawing Sheets

DC/AC POWER CONVERTER WITH DC SIDE DOUBLE FREQUENCY PULSATION SUPPRESSION CAUSED BY AC SIDE FAULTS

BACKGROUND OF THE INVENTION

The present invention relates to a semiconductor power converter adapted to be run continuously even when the AC system side is at fault.

In recent years, semiconductor power converters have been applied in increasing fields and thus the necessity of maintaining continuous operation even when the AC system side is at fault is increasing. To cope with such a problem, a method of enhancing the capability for controlling the AC current is proposed in "Development of a Large-Scale Solar Power Generation System", *Hitachi Review*, 2009 March, Vol. 91, No. 03, pp. 56-59.

SUMMARY OF THE INVENTION

This method, however, suffers from the disadvantage that when the AC power supply side is at fault, power pulsations of double power frequency produced on the DC side of the converter cannot be suppressed however much the current controlling performance is enhanced.

The present invention is intended to provide a semiconductor power converter which suppresses pulsations having double frequency of the power supply frequency and produced on the DC side of the semiconductor power converter and which can continue to be run stably even when the AC power supply side is at fault.

The above-described object is achieved in accordance with the teachings of the invention by providing a semiconductor power converter having: a power converter including arms constituting three-phase bridge connections having AC-side terminals which are connected with a three-phase AC system via an inductance, the arms having self-extinguishing semiconductor devices connected thereto, the self-extinguishing semiconductor devices being IGBTs or combinations of MOSFETs and free-wheeling diodes; a voltage-measuring device for measuring an AC voltage developed across the three-phase AC system; a current-measuring device for measuring an AC current flowing through the power converter; a phase detector for detecting the phase $\theta$ of the AC voltage; and an AC current adjuster for outputting commanded pulses to the power converter based on a commanded active current value $I_{qref}$ and a commanded reactive current value $I_{dref}$ along two axes and on an output from the AC current-measuring device. The semiconductor power converter further includes a two-phase voltage vector calculator for receiving a measured value of voltage developed across the three-phase AC system and calculating a positive-sequence voltage vector $V_p$ and a negative-sequence voltage vector $V_n$ and a phase calculator for calculating and outputting a positive-sequence voltage phase $\theta_p$ from a reference phase $\theta$ for the two-phase voltage vector calculator and from the positive-sequence voltage vector $V_p$. The AC current adjuster calculates a commanded positive-sequence current vector $I_{pref}$ from the commanded two-axis current values $I_{qref}$ and $I_{dref}$ and calculates a commanded negative-sequence current vector $I_{qref}$ using the relationship, $I_{nref} = -(V_n/V_p) \times I_{pref}$. Also, the AC current adjuster calculates commanded three-phase current vectors $I_{aref}$, $I_{bref}$, and $I_{cref}$ from the commanded positive-sequence current vector $I_{pref}$ and from the commanded negative-sequence current vector $I_{nref}$, calculates commanded three-phase current values from the commanded three-phase current vectors and from the positive-sequence voltage phase $\theta_p$, and outputs commanded pulses to bring the commanded three-phase current values and the measured AC current values into agreement.

In one feature of this semiconductor power converter according to the invention, there are further provided a three-phase voltage vector calculator for receiving the measured value of voltage of the three-phase AC system and outputting three-phase voltage vectors ($V_a$, $V_b$, $V_c$) and a target voltage calculator for calculating a target voltage vector $E1_{aref}$ of a first phase from the AC voltage vector $V_a$, the commanded current vector $I_{aref}$ and the impedance value of the inductance, calculating a target voltage value $e1_{aref}$ from the target voltage vector $E1_{aref}$ and from the reference phase $\theta$, and similarly calculating and outputting a target voltage value $e1_{bref}$ of a second phase and a target voltage value $e1_{cref}$ of a third phase. The AC current adjuster calculates and outputs correcting three-phase voltage values ($e2_{aref}$, $e2_{bref}$, $e2_{cref}$) to bring the commanded three-phase current values ($i_{aref}$, $i_{bref}$, $i_{cref}$) into agreement with the measured AC current values. The correcting three-phase voltage values ($e2_{aref}$, $e2_{bref}$, $e2_{cref}$) are added to the target three-phase voltage values ($e1_{aref}$, $e1_{bref}$, $e1_{cref}$), respectively, for each individual phase and the results are taken as commanded three-phase voltage values. Commanded pulses are output to bring the three-phase output voltages from the power converter into agreement with the commanded three-phase voltage values.

In a further feature of this semiconductor power converter according to the invention, there are further provided a DC voltage-measuring device for measuring the DC output voltage from the power converter, a DC voltage adjuster for outputting a commanded first-axis current $I_{qref}$ to bring the measured DC output voltage and the commanded DC voltage value into coincidence, a current vector calculator for receiving the measured value of AC current and calculating a positive-sequence current vector $I_p$, and a power factor adjuster for calculating a positive-sequence reactive power output $Q_p$ from the positive-sequence current vector $I_p$ and from the positive-sequence voltage vector $V_p$ and outputting a commanded second-axis current value $I_{dref}$ to bring the positive-sequence reactive power output $Q_p$ and the commanded reactive power value into coincidence. The commanded positive-sequence current vector $I_{pref}$ is calculated from the commanded two-axis current values $I_{qref}$ and $I_{dref}$.

In the present invention, the commanded negative-sequence currents are added to commanded currents to suppress pulsations of the double frequency on the DC side. The commanded negative-sequence currents are found from the detected value of the positive-sequence voltage vector on the power-supply side, the detected value of the negative-sequence voltage vector, and the commanded positive-sequence current. Thus, the problem is solved while maintaining the stability of the current control system.

According to the present invention, a semiconductor power converter can be accomplished which can continue to be operated stably even when the AC power supply is at fault while suppressing pulsations of the double frequency of the power-supply frequency that are produced on the DC side of the converter.

Other objects, features and advantages of the invention will become apparent from the following description of the embodiments of the invention taken in conjunction with the accompanying drawings.

DETAILED DESCRIPTION OF THE INVENTION

Figure 1:
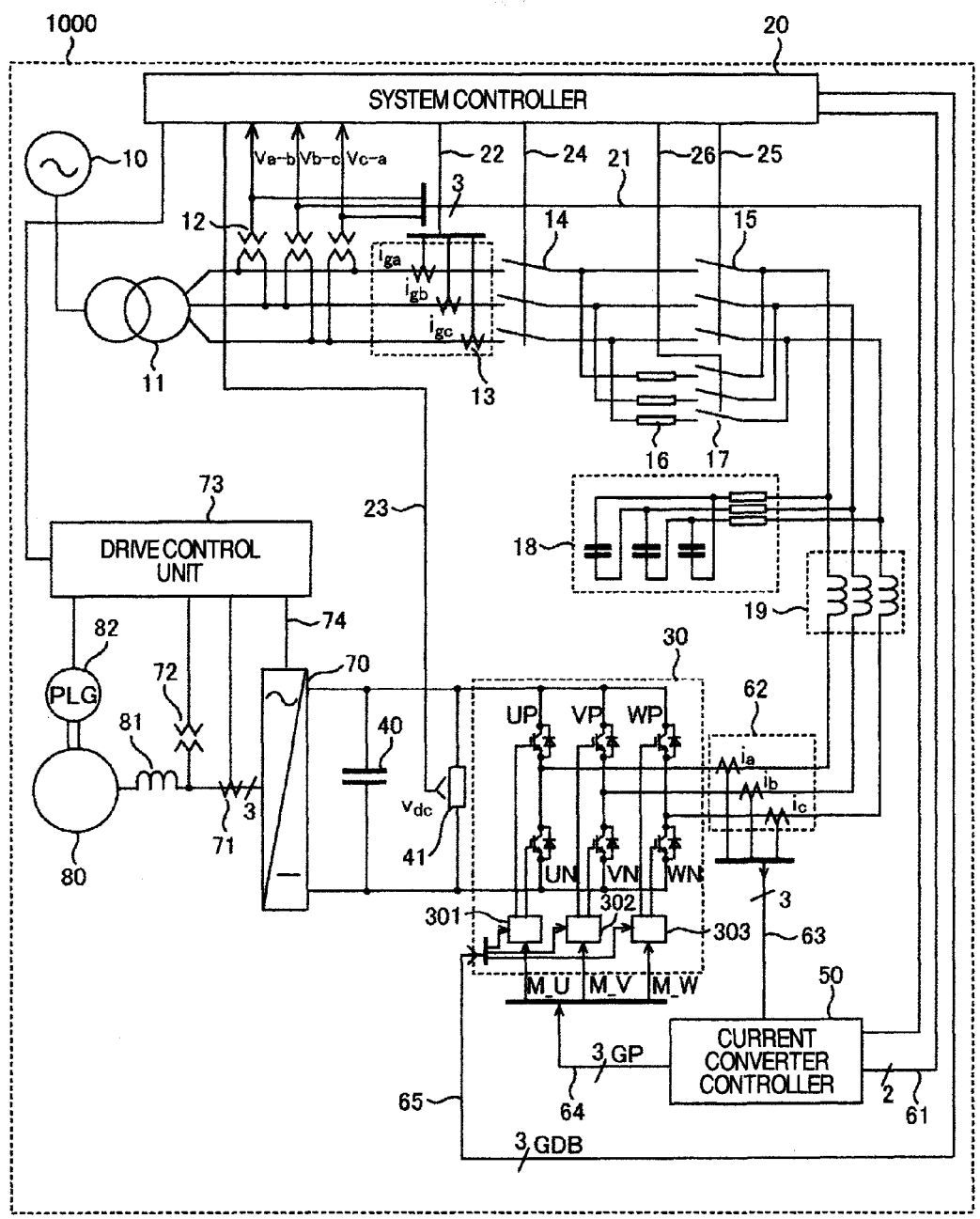
FIG. 1 is a circuit diagram of a semiconductor power converter, showing its structure.

A semiconductor power converter connected with a three-phase alternating-current (AC) system operates to convert an AC-side active power $p_{ac}=V_a \times i_a + v_b \times i_b + v_c \times i_c$ and a DC-side power $p_{dc}=v_{ac} \times i_{dc}$ bidirectionally. If the internal loss of the apparatus is neglected, it follows that $p_{ac}=p_{dc}$.

The relationships between voltage values, current values, voltage vectors, and current vectors for plural phases are now given by Eqs. (1) and (2).

$$v_k = \frac{1}{2}[V_k \cdot e^{j\omega t} + V_k^* \cdot e^{-j\omega t}], k = a, b, c \quad (1)$$

$$i_k = \frac{1}{2}[I_k \cdot e^{j\omega t} + I_k^* \cdot e^{-j\omega t}], k = a, b, c \quad (2)$$

where * is a conjugate complex and $e^{j\omega t}$ is a reference phase for vector calculations.

It is assumed that positive-sequence $V_p$ of voltage, positive-sequence $I_p$ of current, negative-sequence $V_n$ of voltage, and negative-sequence $I_n$ of current are given by Eqs. (3) and (4).

$$\begin{bmatrix} V_a \\ V_b \\ V_c \end{bmatrix} = \begin{bmatrix} 1 & 1 \\ \alpha & \alpha^2 \\ \alpha^2 & \alpha \end{bmatrix} \begin{bmatrix} V_p \\ V_n \end{bmatrix}, \begin{bmatrix} V_p \\ V_n \end{bmatrix} = \frac{1}{3}\begin{bmatrix} 1 & \alpha^2 & \alpha \\ 1 & \alpha & \alpha^2 \end{bmatrix}\begin{bmatrix} V_a \\ V_b \\ V_c \end{bmatrix} \quad (3)$$

$$\begin{bmatrix} I_a \\ I_b \\ I_c \end{bmatrix} = \begin{bmatrix} 1 & 1 \\ \alpha & \alpha^2 \\ \alpha^2 & \alpha \end{bmatrix} \begin{bmatrix} I_p \\ I_n \end{bmatrix}, \begin{bmatrix} I_p \\ I_n \end{bmatrix} = \frac{1}{3}\begin{bmatrix} 1 & \alpha^2 & \alpha \\ 1 & \alpha & \alpha^2 \end{bmatrix}\begin{bmatrix} I_a \\ I_b \\ I_c \end{bmatrix} \quad (4)$$

where $\alpha$ is given by Eq. (5).

$$\alpha = e^{-j\frac{2}{3}\pi} \quad (5)$$

From Eqs. (1), (2), (3), and (4), the AC-side active power $p_{ac}$ is given by (6).

$$p_{ac} = v_a i_a + v_b i_b + v_c i_c \quad (6)$$

$$= \frac{1}{12}\{[V_p I_p^* + V_n I_n^*] + [V_p^* I_p + V_n^* I_n]\} +$$

$$\frac{1}{12}\{[V_p I_n + V_n I_p]e^{2j\omega t} + [V_p^* I_n^* + V_n^* I_p^*]e^{-2j\omega t}\}$$

It can be seen from Eq. (6) above that a condition under which pulsations of the double-frequency components of the power supply disappear is given by (7).

$$V_p I_n + V_n I_p = 0 \quad (7)$$

In order to satisfy the equation given by Eq. (7), it is necessary to adopt a simple control method of securing high responsiveness without impairing the stability.

In the present invention, positive-sequence and negative-sequence voltages are measured as disturbances not affected by the power converter for the sake of simplicity. Furthermore, a commanded two-axis positive-sequence current is divided into a q-axis component in phase with the positive-sequence voltage $V_p$ and a d-axis component orthogonal to the positive-sequence voltage $V_p$ as usual.

Furthermore, for the sake of simplicity, it is assumed that the current control system shows a sufficiently high response and that Eq. (8) holds.

$$I_{pref}=I_p \quad (8)$$

Based on the assumption made thus far, the present invention is characterized in that a commanded negative-sequence current is calculated using Eq. (9).

$$I_{nref} = -\frac{V_n}{V_p}I_{pref} \quad (9)$$

The commanded current $I_{ref}$ is given by Eq. (10).

$$I_{ref}=I_{pref}+I_{nref} \quad (10)$$

In accomplishing the relationship given by Eq. (9), it is necessary to select commanded two-axis positive-sequence currents such that the commanded positive-sequence current $I_{pref}$ and the commanded negative-sequence current $I_{nref}$ are prevented from interfering with each other; otherwise, instability would occur.

In the past, the commanded q-axis current has been so controlled that the DC-side voltage $v_{dc}$ matches the set value. Let C be the capacity of a capacitor on the DC side. The relationship of AC-side positive-sequence active power $P_p$, negative-sequence active power $P_n$, and DC-side power $P_{dc}$ is given by Eq. (11).

$$C\frac{d}{dt}v_{dc} = \frac{1}{v_{dc}}(P_p + P_n - P_{dc}) \quad (11)$$

Only the positive-sequence active power $P_p$ out of the three terms of the right side of Eq. (11) can be adjusted by the commanded q-axis current $i_{qref}$. However, it is considered that the negative-sequence active power $P_n$ and the DC-side power $P_{dc}$ are independent of the positive-sequence active power $P_p$ and that if the commanded q-axis current is controlled by the DC-side voltage $v_{ac}$ in a conventional manner, neither stability nor responsiveness will be affected.

On the other hand, the commanded d-axis current $i_{dref}$ has been so controlled that the AC-side reactive power matches the commanded value, whether the commanded reactive power is computed from the commanded power factor or the commanded reactive power is directly used.

In the present invention, the commanded negative-sequence current $I_{nref}$ is added and, therefore, the commanded positive-sequence current $I_{pref}$ and the commanded negative-sequence current $I_{nref}$ interfere with each other via negative-sequence reactive power due to the negative-sequence voltage and negative-sequence current. To prevent this, positive-sequence reactive power $Q_p$ owing to the positive-sequence voltage and positive-sequence current is used as a measured value of reactive power that is employed for control of the d-axis current, according to one feature of the invention.

As described so far, in the present invention, the commanded negative-sequence current $I_{nref}$ is used in addition to the commanded positive-sequence current $I_{pref}$. In particular, commanded three-phase currents are computed using Eqs. (12) and (13) based on Eqs. (2) and (4).

$$i_{kref} = \frac{1}{2}[I_{kref} \cdot e^{j\theta_p} + I^*_{kref} \cdot e^{-j\theta_p}], k = a, b, c \quad (12)$$

$$\begin{bmatrix} I_{aref} \\ I_{bref} \\ I_{cref} \end{bmatrix} = \begin{bmatrix} 1 & 1 \\ \alpha & \alpha^2 \\ \alpha^2 & \alpha \end{bmatrix} \begin{bmatrix} I_{pref} \\ I_{nref} \end{bmatrix} = \begin{bmatrix} 1 & 1 \\ \alpha & \alpha_2 \\ \alpha^2 & \alpha \end{bmatrix} \begin{bmatrix} I_{qref} - j \cdot i_{dref} \\ I_{nref} \end{bmatrix} \quad (13)$$

Note that $\theta_p$ of Eq. (12) is the positive-sequence voltage phase varying at the positive-sequence voltage frequency. The commanded current of Eq. (12) varies at the power-supply frequency. Owing to improvement of microprocessor performance, the period at which the current control system performs calculations can be made shorter. Therefore, if the commanded value varies at the power-supply frequency, the problem of instability due to digitization can be avoided.

However, as the frequency of the commanded current value goes higher, the output of the integrator constituting the control system varies over a wider range than where the command value is a DC, whether the current controlling and calculating means is analog or digital. Consequently, it is still difficult to afford sufficient latitude in providing control in the presence of external disturbances.

To alleviate this problem, in another feature of the present invention, a target value of output voltage $e1_{ref}$ is computed using Eqs. (14) and (15) by the use of the positive-sequence voltage vector $V_p$, a measured value of negative-sequence voltage vector $V_n$, a commanded positive-sequence current $I_{pref}$, a commanded negative-sequence current $I_{nref}$, and the impedance Z of the inductance of the AC power supply. The computed value is taken as a feedforward control command and added to the correcting voltage value $e2_{ref}$ of the output from a feedback current control system.

$$\begin{bmatrix} E1_{aref} \\ E1_{bref} \\ E1_{cref} \end{bmatrix} = \begin{bmatrix} 1 & 1 \\ \alpha & \alpha^2 \\ \alpha^2 & \alpha \end{bmatrix} \left\{ \begin{bmatrix} V_p \\ V_n \end{bmatrix} - Z \begin{bmatrix} I_{pref} \\ I_{nref} \end{bmatrix} \cdot \frac{V_p}{|V_p|} \right\} \quad (14)$$

$$e1_{kref} = \frac{1}{2}[E1_{kref} \cdot e^{j\theta_p} + E1^*_{kref} \cdot e^{-j\theta_p}], k = a, b, c \quad (15)$$

Embodiments

An embodiment of the present invention is hereinafter described with reference to FIGS. 1-4.

Referring to FIG. 1, a semiconductor power converter 1000 has an alternating-current (AC) system 10 that is connected with a filter circuit 18 for harmonic suppression via a transformer 11, an instrument transformer 12, an instrument current transformer 13, a circuit breaker 14, a contactor 15, initial charging current limiting resistors 16 connected in parallel with the contactor 15, and another contactor 17. The filter circuit 18 is connected with the AC side of a power converter 30 via an inductance 19 for harmonic suppression. A capacitor 40 and a DC voltage-measuring instrument 41 are connected with the DC side of the power converter 30.

The power converter 30 has 6 arms (UP, VP, WP, UN, VN, and WN) arranged to form three-phase bridge connections. Each of the arms has a self-extinguishing semiconductor power conversion device and a diode (free-wheeling diode) connected anti-parallel with the conversion device. The converter 30 is controllably turned on and off by commanded pulse width modulations (M_U, M_V, and M_W). The internal configuration of the power converter 30 will be described later by referring to FIG. 2.

A system controller 20 controls the semiconductor power converter 1000 constructed as described so far. Line voltage signals 21 ($v_{a-b}$, $v_{b-c}$, $v_{c-a}$) about the instrument transformer 12, current signals 22 ($i_{ga}$, $i_{gb}$, $i_{gc}$) for the instrument current transformer, and a DC voltage signal 23 ($v_{dc}$) for the DC voltage-measuring instrument 41 are applied to the system controller 20, which in turn outputs an open/close command signal 24 for the circuit breaker 14, an open/close command 25 for the contactor 15, and an open/close command 26 for the contactor 17. Furthermore, the controller 20 delivers the line voltage signals 21 ($v_{a-b}$, $v_{b-c}$, $v_{c-a}$) and a commanded two-axis current 61 ($I_{pref}$) to a current converter controller 50. In addition, the controller 20 outputs a gate block-canceling signal 65 (GDB) to the power converter 30.

The converter controller 50 receives input AC currents 63 ($i_a$, $i_b$, $i_c$) from an instrument current transformer 62 and outputs commanded pulse width modulations 64 (M_U, M_V, M_W) to the power converter 30 to bring the input currents into agreement with commanded three-phase current values ($i_{aref}$, $i_{bref}$, $i_{cref}$), corresponding to the commanded two-axis current 61 ($I_{pref}$).

In the present embodiment, a second power converter 70 acts as a DC-side load for the semiconductor power converter 1000 and has DC-side terminals connected across the capacitor 40. The second power converter 70 further includes an AC-side terminal connected with a permanent-magnet power generator 80 via an instrument current converter 71, an instrument transformer 72, and an AC inductance 81. A phase detector 82 is directly coupled to the rotating shaft of the power generator. A drive control unit 73 receives a phase signal from the phase detector 82, a current signal from the instrument current transformer 71, and a voltage signal from the instrument transformer 72 and controls the second power converter 70 with a commanded pulse width modulations 74.

When the semiconductor power converter 1000 is set into operation by the structure constructed as described so far, the circuit breaker 14 is closed by the open/close command 24 from the system controller 20. The contactor 15 is opened by the open/close command 25. Under this condition, the contactor 17 is closed by manipulating the open/close command 26.

When electrical charging is completed, the contactor 17 is opened by the open/close command 26. Subsequently, the contactor 15 is closed by the open/close command 25. Thus, preparations for the operation are completed.

The gate block canceling signal 65 (GDB) is set on (level 1) to enable operation of the power converter 30.

The commanded two-axis current 61 is so adjusted that charging is continued until the DC voltage 23 ($V_{dc}$) from the DC voltage detector 41 reaches a given value.

When the power converter 30 is set into operation, the system controller 20 computes a commanded quadrature-axis current $I_{qref}$ such that the DC voltage 23 ($v_{dc}$) becomes equal to the set value. Furthermore, the controller 20 calculates a commanded direct-axis current $I_{dref}$ such that the power factor computed from the AC voltage signal 21 and from the system current signals 22 ($I_{ga}$, $I_{gb}$, $I_{gc}$) becomes unity. The controller 20 outputs the commanded two-axis current 61 ($I_{pref} = I_{qref} - j \times I_{dref}$) to the converter controller 50.

Figure 2:
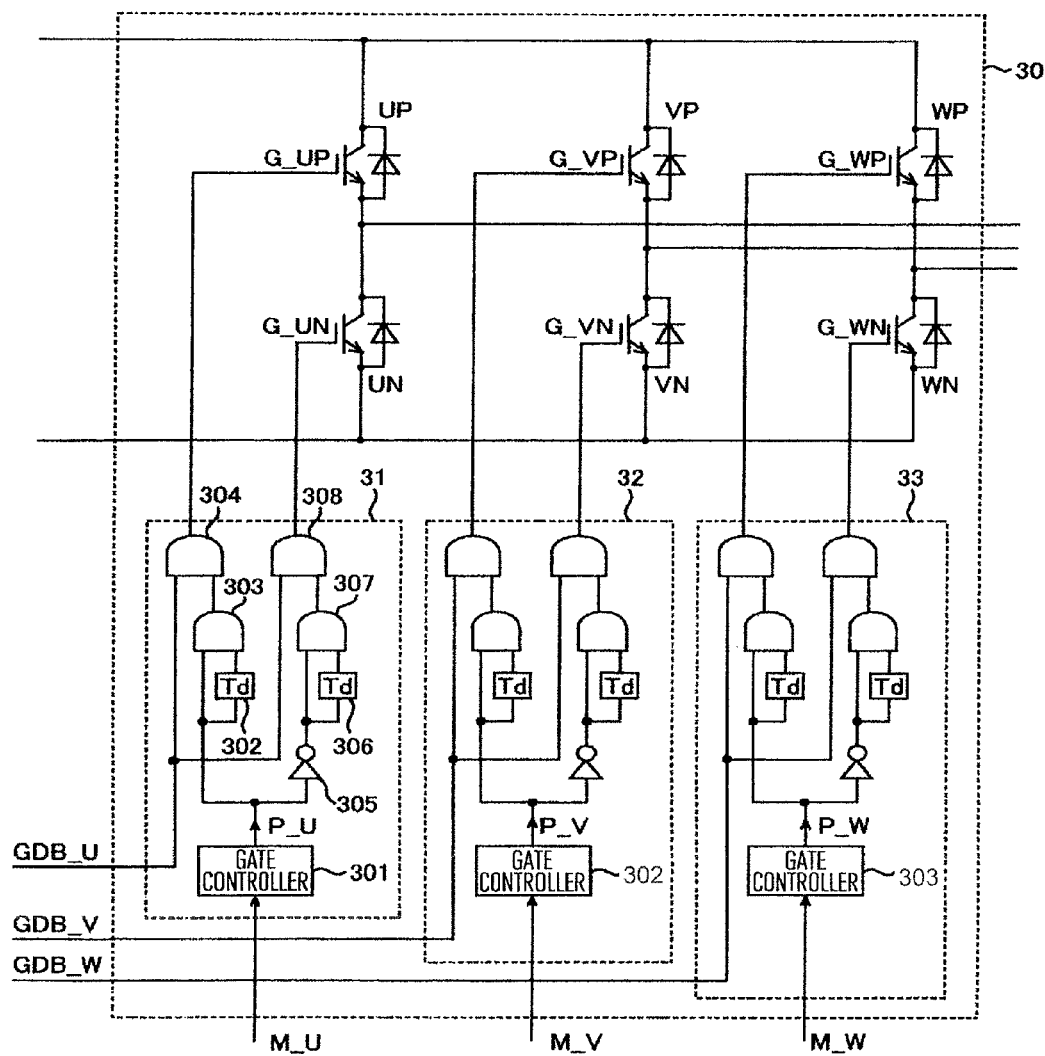
FIG. 2 is an internal circuit diagram of a power converter.

The internal configuration of the first power converter 30 is described by referring to FIG. 2. Gate controllers 301, 302, and 303 receive the commanded pulse width modulations (M_U, M_V, M_W) from the converter controller 50 and output gate signals G_UP, G_UN, G_VP, G_VN, G_WP, and G_WN to the self-extinguishing devices. Since the gate controllers 301, 302, and 303 of the different phases are identical in configuration and operation, only the gate controller 301 of phase U is described below.

Figure 3:
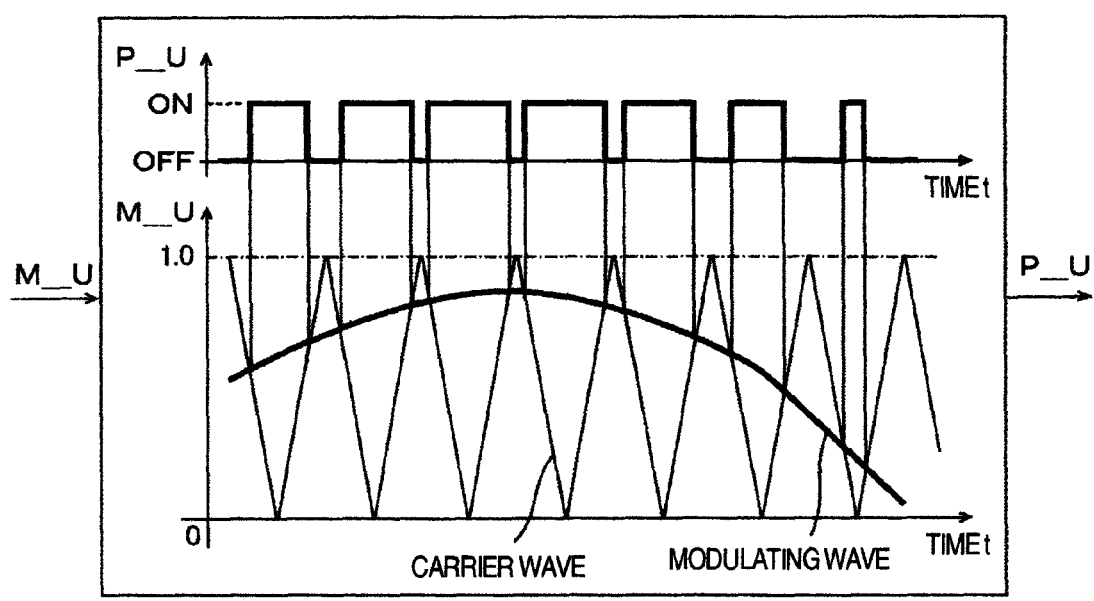
FIG. 3 is a graph showing the operation of a pulse width modulator.

FIG. 3 illustrates the operation of the gate controller 301. The commanded pulse width modulation M_U is used as a modulating wave and compared in terms of magnitude with a carrier wave in the form of a triangular wave. Where the commanded pulse M_U is larger, the commanded pulse P_U is set ON (level 1). Where the commanded pulse M_U is equal to unity (M_U=1), the pulse P_U is kept ON. Where the pulse M_U=0, the pulse P_U is kept OFF (level 0). Where the pulse M_U=0.5, the ON period is equal to the OFF period. The commanded pulse P_U is branched and applied to a delay circuit 302 having a delay time of Td. The output and pulse P_U are applied to an AND logic circuit 303 to prevent simultaneous energization of the arms UP and UN; otherwise, the capacitor 40 would be shorted.

On the other hand, the gate block-canceling signal GDB_U from the system controller 20 outputs an ON signal (level 1) at normal times. If any fault is detected, the controller outputs an OFF signal (level 0). The canceling signal GDB_U and the output from the AND logic circuit 303 are applied to an AND logic circuit 304, which in turn outputs a gating signal G_UP to the self-extinguishing device on the arm UP. In consequence, the gating signal G_UP can be set OFF by setting OFF the canceling signal GDB_U from the system controller 20 irrespective of the signal from the AND logic circuit 303.

On the other hand, the gating signal P_N to the self-extinguishing device on the arm UN inverts (turns ON or OFF) the commanded pulse P_U through a NOT logic circuit 305 and is branched and applied to a delay circuit 306 with delay time Td. This output and the output from the NAND circuit 305 are applied to an AND logic circuit 307. The gate block-canceling signal GDB_U from the system controller 20 and the output from the AND logic circuit 307 are applied to an AND logic circuit 308 whose output is applied as the gating signal G_UN to the self-extinguishing device on the arm UN.

Figure 4:
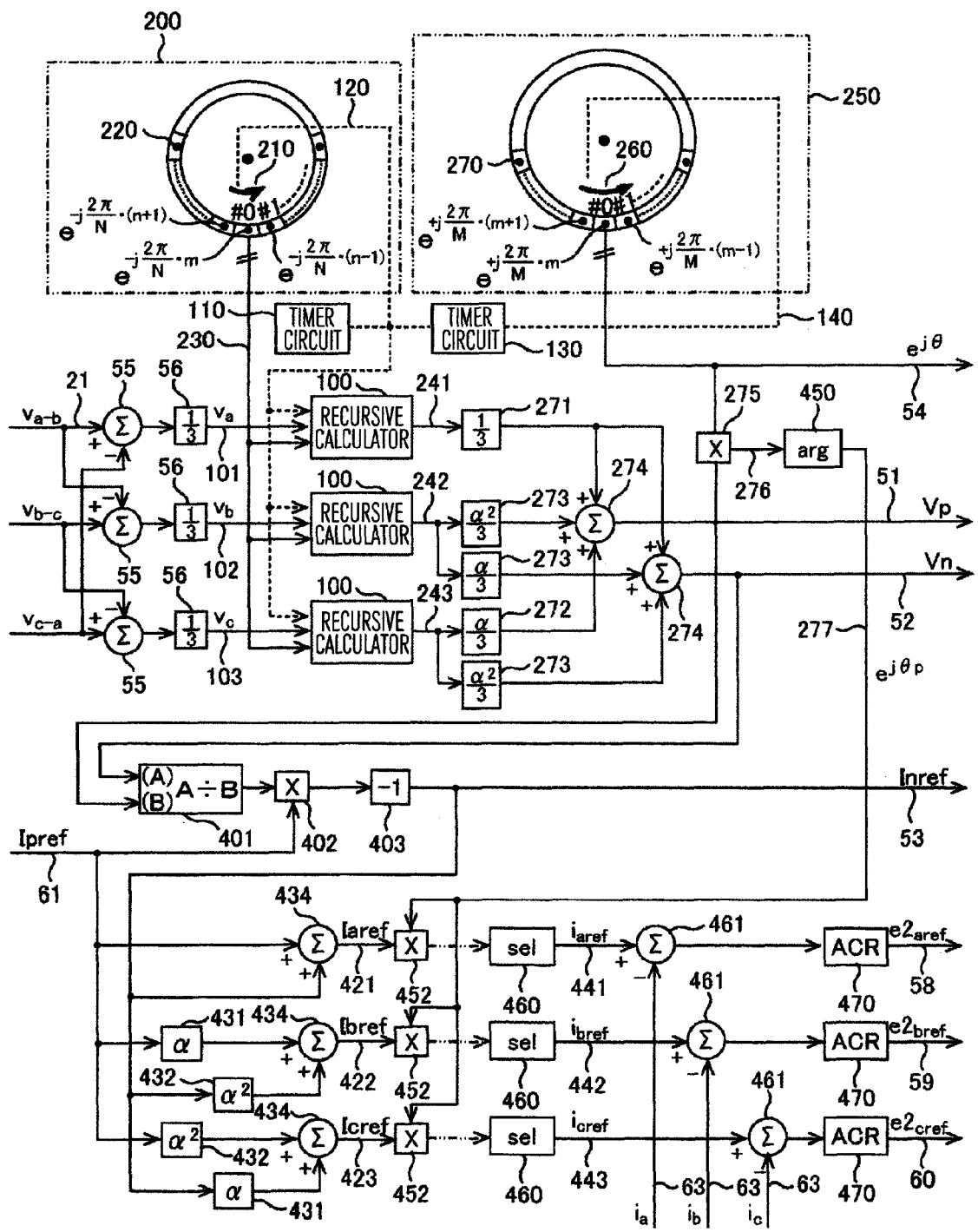
FIG. 4 is a circuit diagram of a conversion controller, showing its structure.

FIG. 4 shows the configuration of the current converter controller 50.

The line voltage signals 21 ($v_{a-b}$, $v_{b-c}$, $v_{c-a}$) from the instrument transformer 12 are converted into phase voltage signals 101 ($v_a$), 102 ($v_b$), and 103 ($v_c$) by means of subtractors 55 and coefficient multipliers 56 and applied to three recursive calculators 100. The configuration of the recursive calculators 100 will be described by referring to FIG. 5.

Each recursive calculator 100 is driven by timer pulses 120 from a timer circuit 110. A first Fourier coefficient generator 200 is driven by the timer pulses 120. A shift register 210 is stepped whenever one timer pulse 120 arrives. Data items in N constant memory cells 220 constituting a ring memory are output as the coefficient data 230 one by one in address order and input into the recursive calculators 100. Each one recursive calculator 100 is provided for each of three-phase phase voltage signals. The recursive calculators 100 deliver phase voltage vector calculation results 241, 242, and 243. The recursive calculators 100 are so configured that the vector calculation results constitute the fundamental frequency component of a recursive discrete Fourier transform of period N.

A positive-sequence voltage vector 51 ($V_p$) and a negative-sequence voltage vector 52 ($V_n$) are produced from the phase voltage vector calculation results 241, 242, and 243 by means of coefficient multipliers 271, 272, 273 and adders 274.

A positive-sequence voltage vector 276 rotating at the positive-sequence voltage frequency is produced from the positive-sequence voltage vector 51 ($V_p$) by a vector reference phase 54 [$\exp(j \cdot \theta)$] from a second Fourier coefficient generator 250 and by a multiplier 275. A deflection angle calculator 450 delivers the positive-sequence voltage phase 277 [$\exp(j \cdot \theta_p)$].

The second Fourier coefficient generator 250 is driven by the timer pulses 140 from a timer circuit 130. The timer circuit 130 produces pulses 131 of an m-times higher frequency (where m is a natural number) synchronized with the timer pulses 120. The second Fourier coefficient generator 250 steps a shift register 260 in response to each timer pulse 140. Data items in M (=m×N) constant memory cells 270 constituting a ring memory are output as the vector reference phase 54 [$\exp(j \cdot \theta)$] one by one in address order.

When the timer pulses 120 and timer pulses 140 overlap once per m times, the first Fourier coefficient generator 200 and the second Fourier coefficient generator 250 are so adjusted that the coefficient data 230 and the vector reference phase 54 [$\exp(j \cdot \theta)$] have a conjugate relationship to one another.

To calculate a commanded negative-sequence current 53 ($I_{nref}$) from the positive-sequence voltage vector 51 ($V_p$), the negative-sequence voltage vector 52 ($V_n$), and the commanded positive-sequence current 61 ($I_{pref}$) by the use of Eq. (9), a divider 401, a multiplier 402, and a coefficient multiplier 403 are connected.

To calculate command current vectors 421 ($I_{aref}$), 422 ($I_{bref}$), 423 ($I_{cref}$) of various phases through the use of Eq. (13), coefficient multipliers 431, 432 and adders 434 are connected.

To compute commanded current values 441 ($i_{aref}$), 442 ($i_{bref}$), and 443 ($i_{cref}$) of various phases using Eq. (12), they are multiplied by the positive-sequence voltage phase 277 [$\exp(j \cdot \theta_p)$] by means of their respective multipliers 452. Selectors 460 for selecting the real part outputs are connected.

The commanded current values 441 ($i_{aref}$), 442 ($i_{bref}$), and 443 ($i_{cref}$) of the various phases are combined with the input AC currents 63 ($i_a$, $i_b$, $i_c$) from the instrument current transformer 62 by means of subtractors 461 for each phase and applied to their respective current control circuits 470 each made of a proportional integrator circuit. The control circuits 470 deliver voltage correcting values 58 ($e2_{aref}$), 59 ($e2_{bref}$), and 60 ($e2_{cref}$), respectively. In the case of the present embodiment, the voltage correcting values 58 ($e2_{aref}$), 59 ($e2_{bref}$), and 60 ($e2_{cref}$) are output as the pulse width modulation commands 64 (M_U, M_V, and M_W).

According to the embodiment of the present invention, the commanded current values 441 ($i_{aref}$), 442 ($i_{bref}$), and 443 ($i_{cref}$) of the various phases are updated whenever each timer pulse 140 arrives. Since these values provide a voltage frequency signal varying in finer steps than obtained by recursive discrete Fourier calculation results varying at the intervals of the timer pulses 120, there is the advantage that the harmonics of the semiconductor power converter are reduced.

Figure 5:
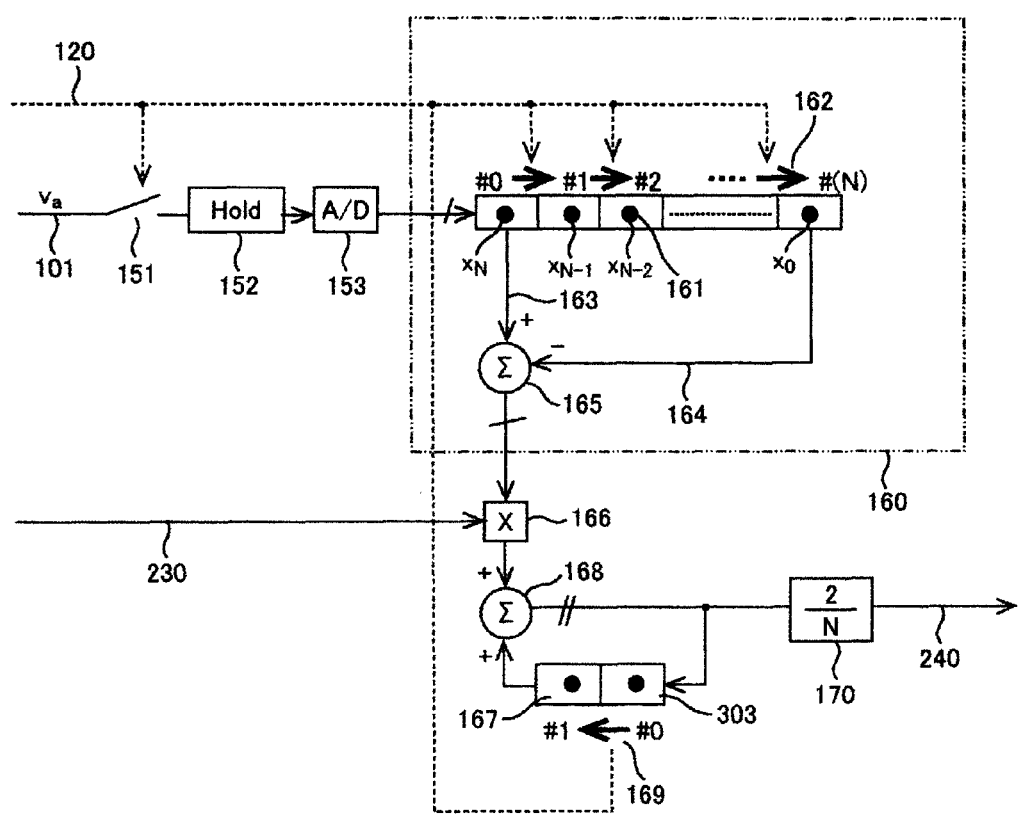
FIG. 5 is a circuit diagram of a recursive calculator.

FIG. 5 shows the configuration of each recursive calculator 100.

In the present embodiment, three recursive calculators of the configuration of FIG. 5 are connected. Since the calculators of the phases are identical in configuration, the recursive calculator for phase voltage a is taken as an example below.

The input voltage signal 101 ($v_a$) of phase voltage a is sampled by a sampler 151 synchronized with the timer pulses 120 delivered at regular intervals of T. The resulting data is digitized by a sample-and-hold circuit 152 and an A/D converter 153 and output to a data table 160.

The data table 160 is made up of (N+1) data memory cells 161 and N shift registers 162. Input data items ($x_0, x_1, x_2, \ldots, x_N$) are recorded in the shift registers 162 in turn from address #(N) toward #(0) in synchronism with the timer pulses 120. In particular, there is a method of shifting data from memory address #(N−1) to #(N) and then from #(N−2) to #(N−1) and finally from #(0) to #(1). The newest input data item 163 ($x_N$) and data item 164 ($x_0$) occurring N samples earlier are read from the data table.

The difference between the newest input data item 163 ($x_N$) and the data item 164 ($x_0$) occurring N samples earlier is delivered from a subtractor 165 and multiplied by coefficient data 230 from the first Fourier coefficient generator 200 by means of a multiplier 166. The resulting product is added to the previous value written at the memory address #(1) of a shift memory 167 for phase voltage vector calculation results by means of an adder 168. Phase voltage vector calculation results 240 are output via a coefficient multiplier 170.

The shift memory 167 for phase voltage vector calculation results acts to shift data using a shift register 169 synchronized with the timer pulses 120.

Figure 6:
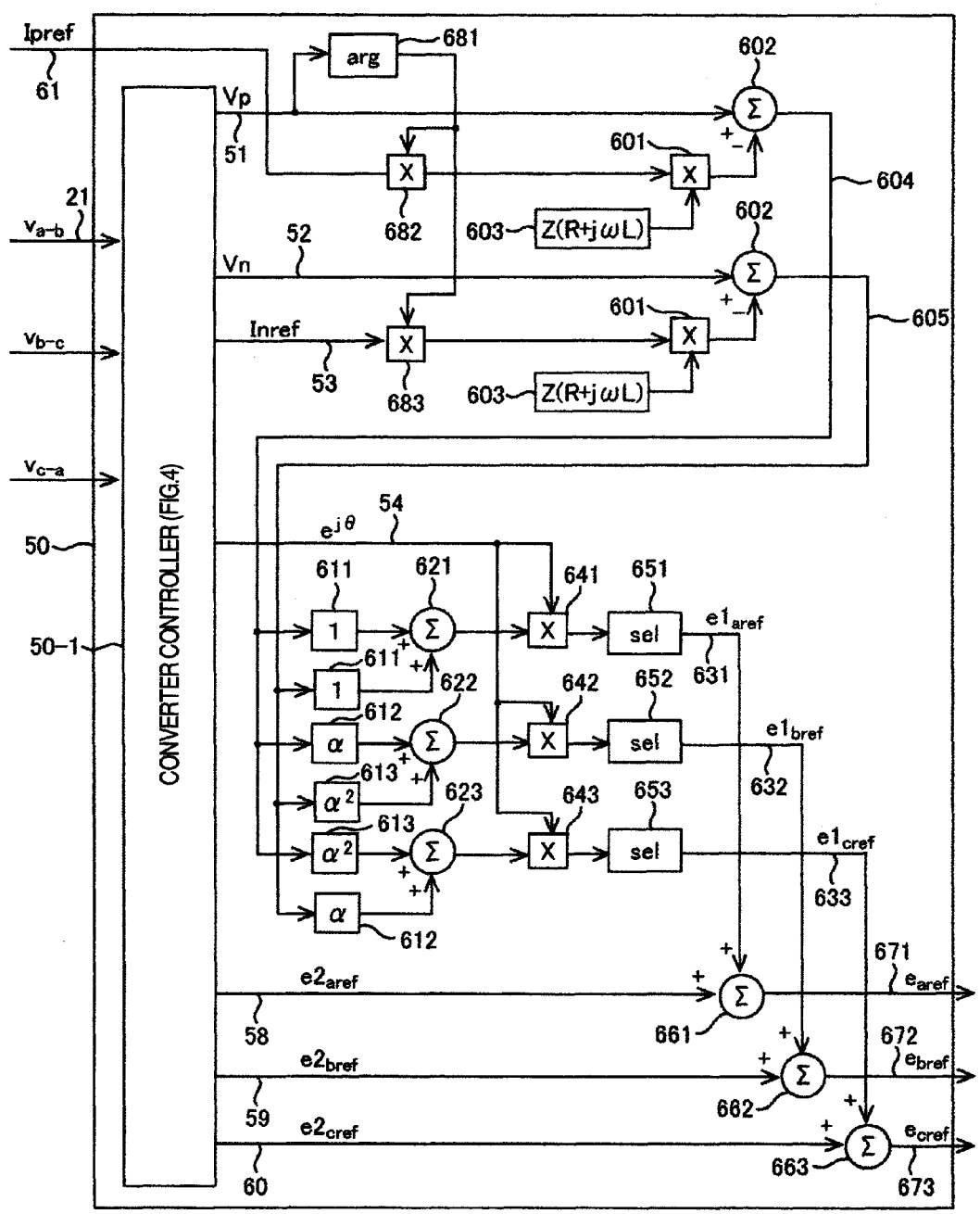
FIG. 6 is a circuit diagram of another conversion controller.

Another embodiment of the present invention is next described by referring to FIG. 6.

A converter controller 50-1 is identical with the counterpart shown in FIG. 4 and thus its description is omitted for brevity. Target output voltage vectors of positive and negative-sequences are calculated from the positive-sequence voltage vector 51 ($V_p$), negative-sequence voltage vector 52 ($V_n$), commanded positive-sequence current 61 ($I_{pref}$), and commanded negative-sequence current 53 ($I_{nref}$) using Eq. (14).

First, in order to rotate the commanded positive-sequence current 61 ($I_{pref}$) and the commanded negative-sequence current 53 ($I_{nref}$) through a deflection angle of the positive-sequence voltage vector 51 ($V_p$), the deflection angle of the positive-sequence voltage vector 51 ($V_p$) is output from a deflection angle calculator 681. The commanded positive-sequence current 61 ($I_{pref}$) is rotated by a multiplier 682. The commanded negative-sequence current 53 ($I_{nref}$) is rotated by a multiplier 683. These are connected with multipliers 601 and subtractors 602. The output from each constant generator 603 corresponds to the impedance of the AC inductance 19. To calculate the target output voltage vectors of the various phases from a target positive-sequence voltage vector 604 and a target negative-sequence voltage vector 605, coefficient multipliers 611, 612, 613 and adders 621, 622, 623 are connected. To calculate target phase-voltage values 631 (e1$_{aref}$), 632 (e1$_{bref}$), and 633 (e1$_{cref}$) using Eq. (15), the vector reference phase 54 [exp(j·θ)] from the second Fourier coefficient generator 250 is subjected to multiplications using multipliers 641, 642, and 643, respectively. Selectors 651, 652, and 653 for selectively outputting the real parts are connected.

In response to the correcting voltage values 58 (e2$_{aref}$), 59 (e2$_{bref}$), and 60 (e2$_{cref}$) that are feedback control outputs from the current control circuits 470, the target phase-voltage values 631 (e1$_{aref}$), 632 (e1$_{bref}$), and 633 (e1$_{cref}$) are feedforward control outputs. These are summed up by adders 661, 662, and 663 for each phase, producing results 671 (e$_{aref}$), 672 (e$_{bref}$), and 673 (e$_{cref}$) which are output as the pulse width modulation commands 64 (M_U, M_V, and M_W).

According to the present embodiment, phase-voltage vectors of the various phases are computed from the positive-sequence voltage vector 51 ($V_p$) and the negative-sequence voltage vector 52 ($V_n$) without directly using the phase-voltage vector calculation results 241, 242, and 243. This produces the effect that oscillations due to errors of the vector calculation results when the voltage frequency deviates from the reference frequency are compressed.

Figure 7:
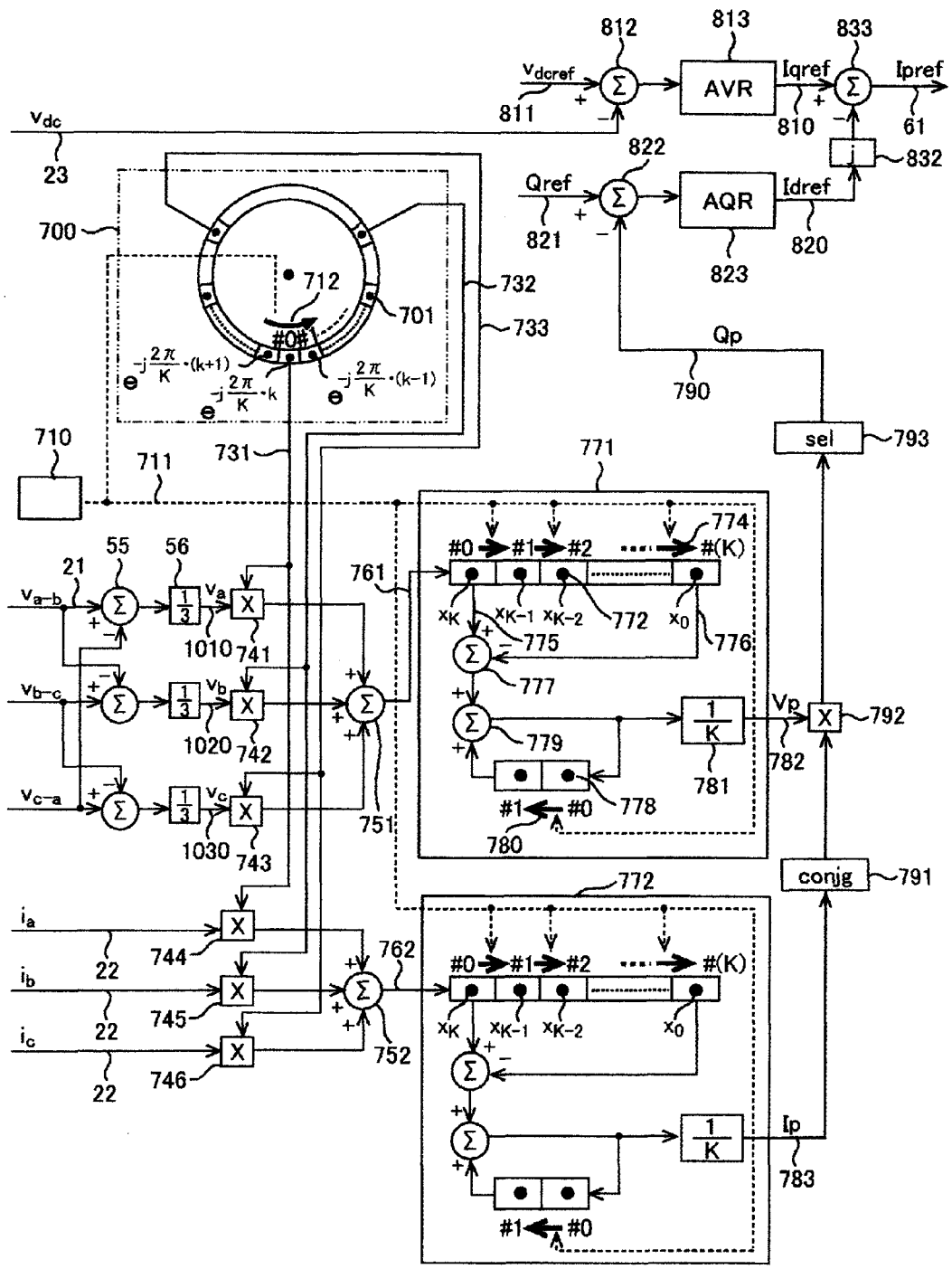
FIG. 7 is a circuit diagram of a system controller.

A further embodiment of the invention is next described by referring to FIG. 7.

With respect to voltage signals, the line voltage signals 21 ($v_{a-b}$, $v_{b-c}$, and $v_{c-a}$) from the instrument transformer 12 are computationally processed by the subtractors 55 and the coefficient multipliers 56, providing outputs of the phase-voltage signals 1010 ($v_a$), 1020 ($v_b$), and 1030 ($v_c$). With respect to current signals, the current signals 22 ($i_a$, $i_b$, and $i_c$) from the instrument current transformer 13 are input.

A reference phase generator 700 is driven by a timer circuit 710. Timer pulses 711 are in synchronism with the computational cycle of the system controller 20. A shift register 712 is shifted whenever each timer pulse 711 arrives. Data items in K constant memory cells 701 constituting a ring memory are output as coefficient data items 731 one by one in address order. Similarly, coefficient data items 732 and 733 which are shifted in phase from the coefficient data items 731 by ±2π/3 are output. Two-axis converted voltage and current vectors 761 and 762 are calculated by an instantaneous value symmetrical component method using multipliers 741, 742, 743, 744, 745, 746 and adders 751, 752.

When the voltage vector 761 and the current vector 762 obtained by the instantaneous value symmetrical component method are applied to moving average calculation circuits 771 and 772, respectively, which output the moving averages of K data items in synchronism with the timer pulses 711, a positive-sequence voltage vector 782 ($V_p$) and a positive-sequence current vector 783 ($I_p$) are output. The results are equal to the fundamental wave component of a recursive discrete Fourier transform of period K.

The moving average calculation circuits 771 and 772 are identical in configuration and so only the circuit 771 is described below.

It is assumed that the moving average calculation circuit 771 is made up of (K+1) data memory cells 772 and K shift registers 774. Input data items ($x_0, x_1, x_2, \ldots, x_K$) are recorded in the shift registers 774 in turn from address #(K) toward #(0) in synchronism with the timer pulses 711. In particular, there is a method of shifting each data item from memory address #(K−1) to #(K) and then from #(K−2) to #(K−1) and finally from #(0) to #(1). The newest input data item 775 ($x_K$) and data item 776 ($x_0$) occurring N samples earlier are read from the data table. The difference between them is applied to a subtractor 777 and added to the memory address #(1) in a shift memory 778 by means of an adder 779. The shift memory 778 is synchronized with a shift register 780. The memory address #(1) is the previous value of the additive operation results. The output from the adder 779 is multiplied by a factor of (1/K) by a coefficient multiplier 781, and the moving average calculation results 782 are output. The calculation results 782 give the positive-sequence voltage vector ($V_p$).

The positive-sequence current vector 783 ($I_p$) is calculated by the moving average calculation circuit 772 in the same way as for the positive-sequence voltage vector 782 ($V_p$). In order to calculate a positive-sequence reactive power 790 from the positive-sequence voltage vector 782 ($V_p$) and from the positive-sequence current vector 783 ($I_p$), a conjugate complex calculator 791, a multiplier 792, and a selector 793 for selectively outputting the imaginary part are connected.

Out of the commanded two-axis current 61 ($I_{pref}=I_{qref}-j\times I_{dref}$), the quadrature-axis component 810 ($I_{qref}$) causes a commanded DC voltage 811 ($v_{dcref}$) to be compared with the DC voltage signal 23 ($v_{dc}$) by means of a subtractor 812. The result is applied to a DC voltage adjuster (AVR) 813 and is output.

A commanded direct-axis current 820 ($I_{dref}$) causes a commanded reactive power 821 and the positive-sequence reactive power 790 ($Q_p$) to be compared with each other by a subtractor 822. The result is applied to a reactive power adjuster 823 (AQR) and is output.

The commanded quadrature-axis current 810 ($I_{qref}$) and the commanded direct-axis current 820 ($I_{dref}$) are coupled to a coefficient multiplier 832 and a subtractor 833, respectively, and the commanded positive-sequence current 61 ($I_{pref}$) is output.

According to the embodiments of the present invention, the results of calculation performed by the instantaneous value symmetrical component method are moving-averaged. Then, positive-sequence vectors are calculated by discrete Fourier transform. This creates the advantage that the same calculational results can be obtained with a small amount of data memory.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A semiconductor power converter comprising:
   a power converter including arms constituting three-phase bridge connections having AC-side terminals which are connected with a three-phase AC system via an inductance, said arms having self-extinguishing semiconductor devices connected thereto, said self-extinguishing semiconductor devices being IGBTs or combinations of MOSFETs and free-wheeling diodes;
   a voltage-measuring device for measuring an AC voltage developed across the three-phase AC system;
   a current-measuring device for measuring an AC current flowing through the power converter;
   a phase detector for detecting phase θ of the AC voltage;
   an AC current adjuster for outputting commanded pulses to the power converter based on a commanded active current value $I_{qref}$ and a commanded reactive current value $I_{dref}$ along two axes and on an output from the AC current-measuring device;
   a two-phase voltage vector calculator for receiving a measured value of voltage developed across the three-phase AC system and calculating a positive-sequence voltage vector $V_p$ and a negative-sequence voltage vector $V_n$; and
   a phase calculator for calculating and outputting a positive-sequence voltage phase $\theta_p$ from a reference phase θ for the two-phase voltage vector calculator and from the positive-sequence voltage vector $V_p$;
   wherein said AC current adjuster calculates a commanded positive-sequence current vector $I_{pref}$ from the commanded two-axis current values $I_{qref}$ and $I_{dref}$, calculates a commanded negative-sequence current vector $I_{nref}$ using the relationship, $I_{nref}=-(V_n/V_p) \times I_{pref}$, calculates commanded three-phase current vectors $I_{aref}$, $I_{bref}$, and $I_{cref}$ from the commanded positive-sequence current vector $I_{pref}$ and from the commanded negative-sequence current vector $I_{nref}$, calculates commanded three-phase current values from the commanded three-phase current vectors and from the positive-sequence voltage phase $\theta_p$, and outputs commanded pulses to bring the commanded three-phase current values into agreement with the measured values of AC current.

2. The semiconductor power converter of claim 1, wherein there are further provided a three-phase voltage vector calculator for receiving the measured value of voltage of the three-phase AC system and outputting three-phase voltage vectors ($V_a$, $V_b$, $V_c$) and a target voltage calculator for calculating a target voltage vector $E1_{aref}$ of a first phase from the AC voltage vector $V_a$, the commanded current vector $I_{aref}$, and the impedance value of the inductance, calculating a target voltage value $e1_{aref}$ from the target voltage vector $E1_{aref}$ and from the reference phase θ, and similarly calculating and outputting a target voltage value $e1_{bref}$ of a second phase and a target voltage value $e1_{cref}$ of a third phase, and wherein said AC current adjuster calculates and outputs correcting three-phase voltage values ($e2_{aref}$, $e2_{bref}$, $e2_{cref}$) to bring the commanded three-phase current values ($i_{aref}$, $i_{bref}$, $i_{cref}$) into agreement with the measured AC current values, adds the correcting three-phase voltage values ($e2_{aref}$, $e2_{bref}$, $e2_{cref}$) to the target three-phase voltage values ($e1_{aref}$, $e1_{bref}$, $e1_{cref}$), respectively, for each individual phase, takes the results as commanded three-phase voltage values, and outputs commanded pulses to bring the three-phase output voltages from the power converter into agreement with the commanded three-phase voltage values.

3. The semiconductor power converter of claim 1, further comprising a DC voltage-measuring device for measuring the DC output voltage from the power converter, a DC voltage adjuster for outputting a commanded first-axis current $I_{qref}$ to bring the measured DC voltage value and the commanded DC voltage value into coincidence, a current vector calculator for receiving the measured value of AC current and calculating a positive-sequence current vector $I_p$, and a power factor adjuster for calculating a positive-sequence reactive power output $Q_p$ from the positive-sequence current vector $I_p$ and from the positive-sequence voltage vector $V_p$ and outputting a commanded second-axis current value $I_{dref}$ to bring the positive-sequence reactive power output $Q_p$ and the commanded reactive power value into coincidence, and wherein said commanded positive-sequence current vector $I_{pref}$ is calculated from the commanded two-axis current values $I_{qref}$ and $I_{dref}$.

* * * * *